(12) United States Patent
Takahashi

(10) Patent No.: US 9,009,325 B2
(45) Date of Patent: *Apr. 14, 2015

(54) CONTENTS DELIVERY SYSTEM, A CONTENTS DELIVERY METHOD, AND A PROGRAM FOR CONTENTS DELIVERY

(71) Applicant: NEC Corporation, Tokyo (JP)

(72) Inventor: Eiji Takahashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,426

(22) Filed: Feb. 24, 2014

(65) Prior Publication Data

US 2014/0173118 A1 Jun. 19, 2014

Related U.S. Application Data

(63) Continuation of application No. 13/392,015, filed as application No. PCT/JP2010/064546 on Aug. 20, 2010, now Pat. No. 8,694,643.

(30) Foreign Application Priority Data

Aug. 24, 2009 (JP) ................................. 2009-192739

(51) Int. Cl.
*G06F 15/173* (2006.01)
*H04L 29/08* (2006.01)

(52) U.S. Cl.
CPC ........ *H04L 67/1004* (2013.01); *H04L 67/1008* (2013.01); *H04L 67/1031* (2013.01)

(58) Field of Classification Search
CPC ............ H04L 67/1004; H04L 67/1008; H04L 67/1031

USPC .......................................... 709/223–224, 226
See application file for complete search history.

(56) References Cited

U.S. PATENT DOCUMENTS 8,780,718 B2 * 7/2014 Gandhewar et al. .......... 370/235
8,850,056 B2 * 9/2014 Chouanard et al. ........... 709/232
(Continued)

FOREIGN PATENT DOCUMENTS

JP 09-205634 A 8/1997
JP 2003-242057 A 8/2003
(Continued)

*Primary Examiner* — Waseem Ashraf
(74) *Attorney, Agent, or Firm* — Sughrue Mion, PLLC

(57) ABSTRACT

[Issues] Without using a load balancer or a media director, and without inquiring a load status from a user terminal to a delivery server, to strive for balancing and smoothing of a load of a delivery server, and to prevent degradation of viewing quality.

[Solution method] A contents delivery server comprising: a load information exchanging and memorizing unit which receives and memorizes load information (other server information) from other contents delivery servers in a network, and memorizes load information (own server information) of own contents delivery server; a determination unit which determines presence of free resources of own contents delivery server based on the own server information; a selection unit which, in case the determination unit determined that there exit no free resources, selects one or more other contents delivery servers with a lower load than own contents delivery server from among other contents delivery servers based on the own server information and the other server information; and a redirection unit which requests to the selected other contents delivery servers delivery of contents which are targets of a contents delivery request to a user terminal which transmitted the contents delivery request.

9 Claims, 5 Drawing Sheets

(56) References Cited

U.S. PATENT DOCUMENTS

| | | | |
|---|---|---|---|
| 8,856,281 B2* | 10/2014 | Van der Merwe et al. | 709/219 |
| 2005/0160154 A1* | 7/2005 | Raciborski et al. | 709/219 |
| 2006/0167891 A1* | 7/2006 | Blaisdell et al. | 707/10 |
| 2006/0242263 A1* | 10/2006 | Sato et al. | 709/217 |
| 2007/0180113 A1* | 8/2007 | Van Bemmel | 709/226 |
| 2008/0225710 A1* | 9/2008 | Raja et al. | 370/230.1 |
| 2009/0075660 A1* | 3/2009 | Hallenstal et al. | 455/437 |
| 2009/0150536 A1* | 6/2009 | Wolman et al. | 709/224 |
| 2009/0241176 A1* | 9/2009 | Beletski et al. | 726/7 |
| 2009/0254661 A1* | 10/2009 | Fullagar et al. | 709/226 |
| 2010/0031362 A1* | 2/2010 | Himberger et al. | 726/25 |
| 2011/0082937 A1* | 4/2011 | Barbaresi et al. | 709/226 |

FOREIGN PATENT DOCUMENTS

| | | |
|---|---|---|
| JP | 2005-332373 A | 12/2005 |
| JP | 2006-113735 A | 4/2006 |
| JP | 2008-071156 A | 3/2008 |
| JP | 2008-146153 A | 6/2008 |

* cited by examiner

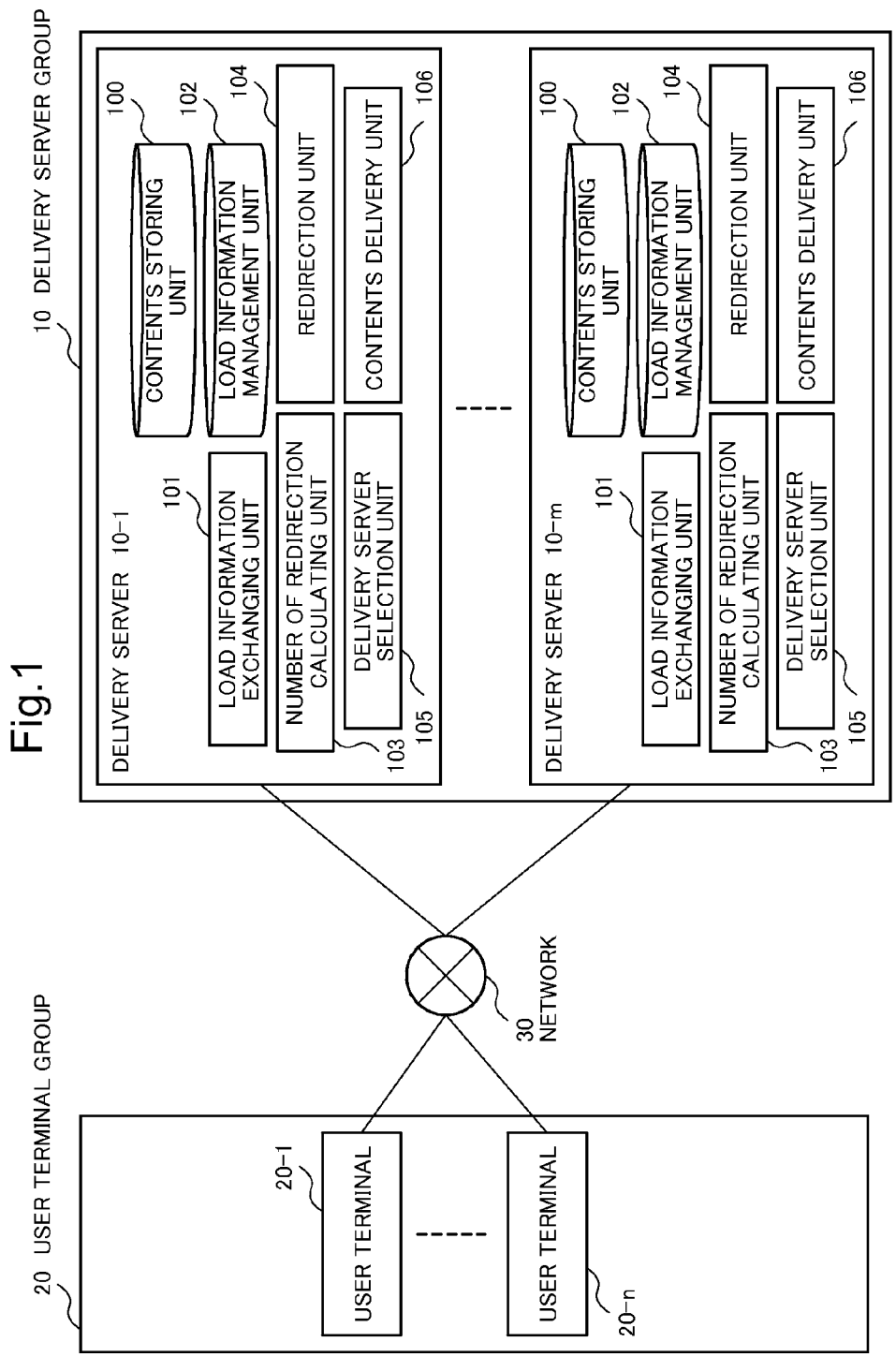

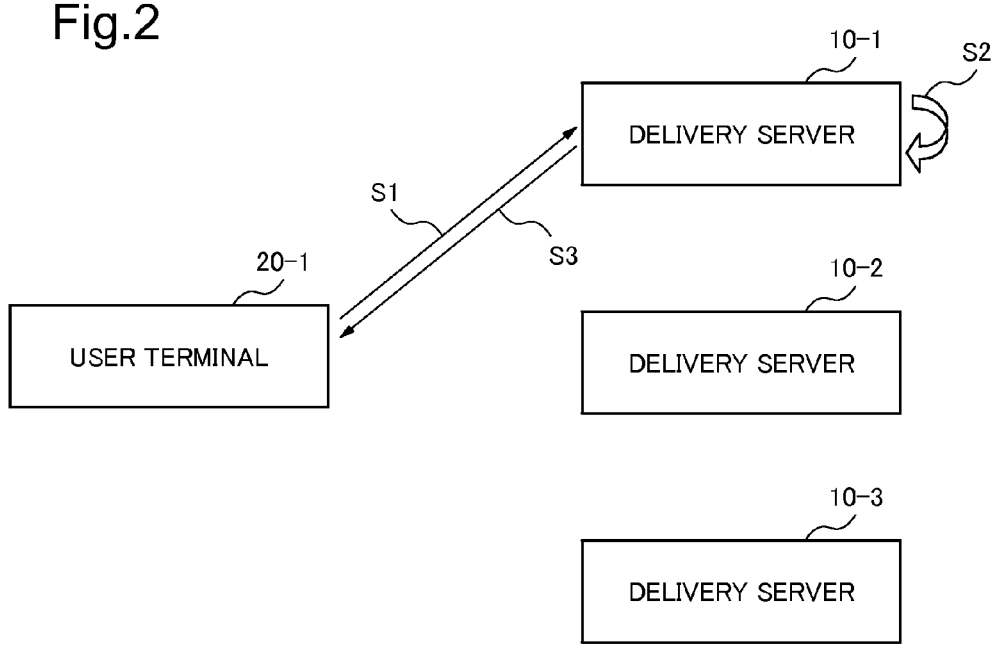
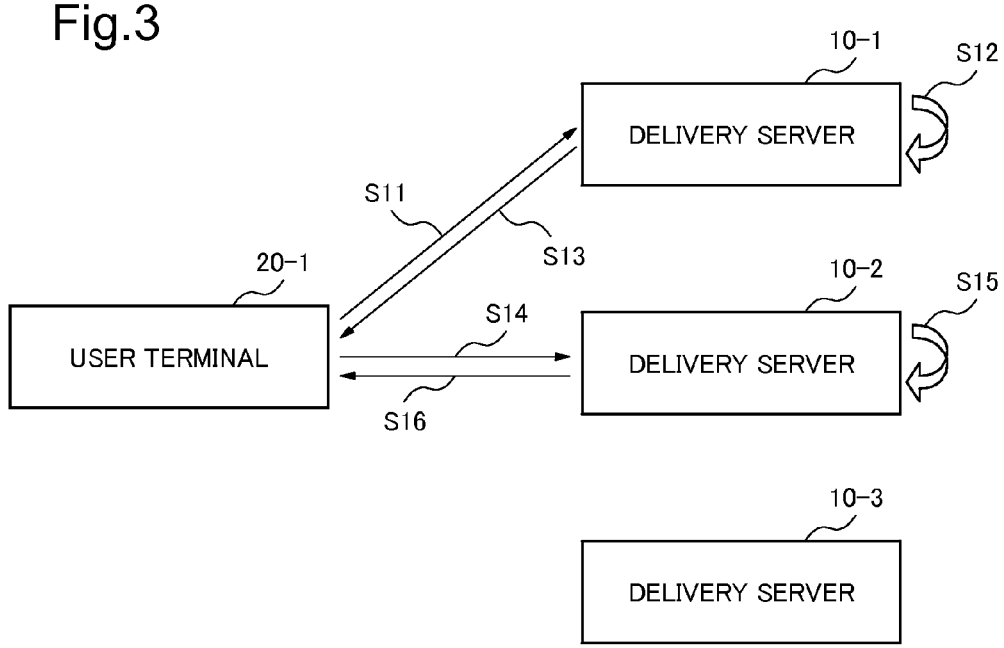

| DELIVERY SERVER | IP ADDRESS | LOAD |
|---|---|---|
| DELIVERY SERVER 10-1 | 10.1.1.1 | 0.5 |
| DELIVERY SERVER 10-2 | 10.1.1.2 | 0.3 |
| DELIVERY SERVER 10-3 | 10.1.1.3 | 0.1 |

CONTENTS DELIVERY SYSTEM, A CONTENTS DELIVERY METHOD, AND A PROGRAM FOR CONTENTS DELIVERY

CROSS REFERENCE TO RELATED APPLICATIONS

This application is a continuation of U.S. patent application Ser. No. 13/392,015, filed Feb. 23, 2012, which is a national stage of International Application No. PCT/JP2010/064546, filed Aug. 20, 2010, claiming priority based on Japanese Patent Application No. 2009-192739, filed Aug. 24, 2009, the contents of all of which are incorporated herein by reference in their entirety.

TECHNICAL FIELD

The present invention relates to a contents delivery system, a contents delivery method and a program for contents delivery and, in particular, relates to a contents delivery system, a contents delivery method and a program for contents delivery which delivers contents such as an image via a network.

BACKGROUND ART

In recent years, with the spread of a broadband network, necessity of services is increasing that allow viewing of wanted images when wanted. These services can be realized by delivering contents such as an image to a terminal via a network. As a technology which realizes such services, there exists an image contents delivery system. This system installs an image delivery server in which image contents are accumulated in advance in a network, for example, and delivers image contents from the image delivery server according to a delivery request from a user terminal.

Also, as a contents delivery system similar to the image contents delivery system mentioned above, there exits a web system in which a web delivery server delivers web contents (home page, text data and so on) to a user terminal of delivery request source.

In this web system, when requests of information delivery concentrate on a web delivery server, the web delivery server cannot process the requests by processing power of the web delivery server any more. Therefore, a user terminal may be made to wait a long time for information delivery. Or, in such a case, a failure may occur in which the user terminal cannot receive delivery at all.

Therefore, a delivery server with which a large number of receiving terminals are connected requires construction of a system which balances or reduces a load of the delivery server, and can continue information delivery stably.

Here, as a means to solve load concentration of a delivery server, a method which utilizes a load balancer in a network in which a client (receiving terminal) and a delivery server transmit and receive data is generally used.

For example, Japanese Patent Application Laid-Open No. 2003-242057 (hereinafter, referred to as patent document 1) discloses a contents delivery system using a load balancer. In the contents delivery system described in this patent document 1, a plurality of web delivery servers which can deliver same web contents and a load balancer are installed. The load balancer receives registration of an IP address of respective web delivery servers and also receives setting of one IP address for the load balancer itself. The IP address of the load balancer is disclosed to a receiving terminal as a client as an address of a web delivery server which delivers web contents.

Also, the load balancer always collects load status of the web delivery servers and grasps free web delivery servers with enough room of processing power.

On the other hand, the receiving terminal regards the load balancer as a web delivery server and transmits a delivery request.

The load balancer transmits the received delivery request to a free web server. Then, the free web delivery server outputs a processing result to the delivery request to the load balancer. The load balancer outputs the received processing result to the receiving terminal which is the delivery source of the request.

A contents delivery system with such a structure includes a plurality of web delivery servers. A load balancer manages these web delivery servers and further performs transmission or reception of data. By this structure, even if access concentrates in the contents delivery system, a load of web delivery servers is balanced.

However, in case of an image delivery server, it is difficult to utilize the load balancer mentioned above. In case of delivery of small data such as text data, because processing in which the load balancer transmits delivery data to the receiving terminal is completed in a short time, quantity of computational resources which is needed for transmission processing is little. However, in case of image delivery, image data which an image delivery server transmits is huge. Moreover, the load balancer has to keep transmitting image data to the receiving terminal continually. For this reason, transmission processing consumes computational resources and so on of the load balancer in large quantities, and as a result, the load of the load balancer itself becomes high. This is the reason why it is difficult to utilize the load balancer mentioned above in case of an image delivery server.

Also, in case a number of connections of receiving terminals is large, and when a load balancer is used, the load balancer will become a bottleneck and the image delivery server cannot deliver an image stably any more. By the way, in case such as the contents delivery system mentioned above delivers image data such as program contents, for example, volume of data which constitutes the image is extremely large compared with text data and so on which a web delivery server and so on delivers. Also, the contents delivery system needs to keep delivering the data continually.

Therefore, delivery processing of an image uses CPU (Central Processing Unit; central processing unit) of the delivery server for a long time. Also, the delivery processing of an image consumes computational resources such as a network band in large quantities. Accordingly, the load of the image delivery server which delivers image data is easy to become high.

Accordingly, when an image delivery server is structured, a technology of load balancing of the image delivery server becomes more important.

Accordingly, as a technology of load balancing of an image delivery server, utilization of not a load balancer but a media director can be considered. As an example of a media director, there is a contents delivery system described in Japanese Patent Application Laid-Open No. 2005-332373 (hereinafter, referred to as patent document 2). The contents delivery system described in patent document 2 includes one media director and a plurality of media engines. The contents delivery system with such a structure operates as follows.

The respective media engines include a memory unit for media contents. Also, the respective media engines include a communication channel for taking out media contents via a network. Also, the respective media engines include a communication channel for streaming media contents via a network. The media director directs extraction of media contents through the network by a selected media engine. Also, the media director includes a controller which fits to trace contents stored in a media engine. This controller fits with redirecting contents which are requested from a media console connected to a media station to one selected media engine among media engines which stores contents corresponding to a streaming request.

However, when a scale becomes large, by the same reason as in the case of a load balancer, an image delivery service will also become difficult to utilize the media director like the contents delivery system described in patent document 2.

From such reasons, an image delivery service needs a means which controls to balance a load of the image delivery service and to reduce a load of a delivery server without using a load balancer or a media director Accordingly, as a contents delivery system which balances a load of an image delivery service without utilizing a load balancer or a media director, a contents delivery system described in Japanese Patent Application Laid-Open No. 2006-113735 (hereinafter, referred to as patent document 3) is proposed. This contents delivery system transmits to a receiving terminal, as delivery data which a contents delivery server delivers, one which are contents data added with an identifier of the contents data and status of a load of the server. The receiving terminal determines the load status of the contents delivery server, connects with other contents delivery server with light load, and continues reception of the contents data.

Also a load balancing system described in Japanese Patent Application Laid-Open No. 2008-71156 (hereinafter, patent document 4) includes a means to exchange load information among a plurality of servers. In this invention, by exchanging this load information, flexibility of processing is accomplished such as when a load of own server exceeds a load target value, making other server execute processing.

DISCLOSURE OF THE INVENTION

Problems to be Solved by the Invention

In the contents delivery system disclosed in patent document 1, a request load and a delivery load concentrate on a load balancer. High processing power is required for this load balancer. To provide the load balancer with high processing power will increase cost of the delivery system. Also, the processing power of the load balancer will be a bottleneck, and a situation also takes place where the contents delivery system cannot deliver an image stably.

The details will be described in the following.

In the contents delivery system disclosed in patent document 1, the load balancer receives from a user terminal a delivery request packet to which a VIP (Virtual Internet Protocol) address is set. The load balancer balances a load of each server by deciding RIP (Routing Information Protocol) which the respective servers include selectively, and by transmitting it by changing it for VIP Accordingly, because the load balancer always needs to grasp the load status of the servers, a monitoring load becomes high. This increase of the monitoring load is a cause which obstructs a stable delivery of an image by the contents delivery system.

Moreover, the load balancer selects RIP of one server from among RIPs in which a destination IP (Internet Protocol) address of a delivery request packet is correlated to the VIP concerned and which are set to a plurality of servers, and transmits by changing this RIP for the VIP. High processing power is required for the load balancer at this time.

Also, in the contents delivery system disclosed in patent document 2, because a request load and a delivery management load concentrate on a media director, high processing power is required also for the media director. This leads to further increase of the cost of the delivery system. Also, the processing power of the media director will be a bottleneck, and a situation also takes place where the contents delivery system cannot deliver an image stably.

The reasons will be described in the followings.

In the contents delivery system disclosed in patent document 2, a media director is requested contents from a media console connected to a media station. The media director responds to this request, selects one among media engines which store contents corresponding to a streaming request and redirects to the media engine.

Therefore, because contents location information and a load status of the media engines always need to be grasped, a monitoring load becomes high.

Moreover, the media director divides the contents into a plurality of segments and delivers them in units of segment. Therefore, it is necessary to select a media engine which delivers the next segment at timing when delivery of a certain segment is completed, and to redirect to the media engine. Therefore, a processing load of server selection processing and for grasping a viewing status of a media console becomes high.

Moreover, in the contents delivery system disclosed in patent document 3, an inquiry of a load status frequently takes place from a user terminal to a contents delivery server. Therefore, the load of the contents delivery server becomes extremely high. Accordingly, this contents delivery system includes a problem that delivery capability of the delivery system as a whole degrades remarkably in particular in case a number of user terminals is large.

The reasons will be described in the followings.

In the contents delivery system disclosed in patent document 3, each user terminal issues a delivery request of contents data to a plurality of delivery servers which delivers contents data. The user terminal obtains, from delivery data which is obtained from a delivery server to which a delivery request is issued, load information of the delivery server and decides the delivery server based on a comparison result of the load. Therefore, the load of the contents delivery server becomes extremely high.

The load balancing system disclosed in patent document 4 is not related to delivery of contents.

The present invention has been made in view of the points mentioned above. The object of the present invention is to strive for balancing and smoothing of a load and preventing degradation of viewing quality with no need of a load balancer, a media director, or an inquiry of a load status from a user terminal to a delivery server.

The present invention provides a contents delivery system, a contents delivery method and a program for contents delivery which achieve the object mentioned above.

Measures for Solving the Problems

In order to achieve the object mentioned above,
a contents delivery system of the present invention is characterized by including: a load information exchanging and memorizing means which exchanges load information at any time among a plurality of delivery servers in a network and memorizes the load information and load information of own server;

a determination means by which a delivery server which received a contents delivery request determines presence of free resources of its own based on the load information;

a selection means which, when the determination means determined that there exist no free resources, selects one or more other delivery servers with a lower load than own delivery server from among other delivery servers; and a redirection means which, for a user terminal which transmitted the contents delivery request, hands over to the selected other delivery server delivery of contents which are targets of the contents delivery request.

Also, in order to achieve the object mentioned above, a contents delivery method of the present invention is characterized by: exchanging load information at any time among a plurality of delivery servers in a network, memorizing the load information and load information of own server; in case a delivery server which received a contents delivery request determines that there exist no free resources of its own based on the load information, selecting one or more other delivery servers with a lower load than own delivery server from among other delivery servers; and for a user terminal which transmitted the contents delivery request, handing over to the selected other delivery server delivery of contents which are targets of the contents delivery request.

Also, in order to achieve the object mentioned above, a contents delivery program of the present invention is characterized by making a computer execute: load information exchanging and memorizing processing which exchanges load information at any time among a plurality of delivery servers in a network and memorize the load information and load information of own server;

determination processing by which a delivery server which received a contents delivery request determines presence of free resources of its own based on the load information;

selection processing which, when the determination means determined that there exist no free resources, selects one or more other delivery servers with a lower load than own delivery server from among other delivery servers; and redirection processing which, for a user terminal which transmitted the contents delivery request, hands over to the selected other delivery server delivery of contents which are targets of the contents delivery request.

Effect of the Invention

According to the present invention, a contents delivery system, a contents delivery method and a program for contents delivery strives for balancing and smoothing of a load of a delivery server and can prevent degradation of viewing quality without using a load balancer or a media director and without inquiring a load status from a user terminal to a delivery server.

BRIEF DESCRIPTION OF THE DRAWINGS

FIG. 1 is a block diagram of an exemplary embodiment of a contents delivery system of the present invention.

FIG. 2 is a block diagram illustrating operation in case free resources exist in a delivery server of a contents delivery request destination in the contents delivery system of FIG. 1.

FIG. 3 is a block diagram illustrating operation in case no free resources exist in a delivery server of a contents delivery request destination in the contents delivery system of FIG. 1.

MODE FOR CARRYING OUT THE INVENTION

Figure 4:
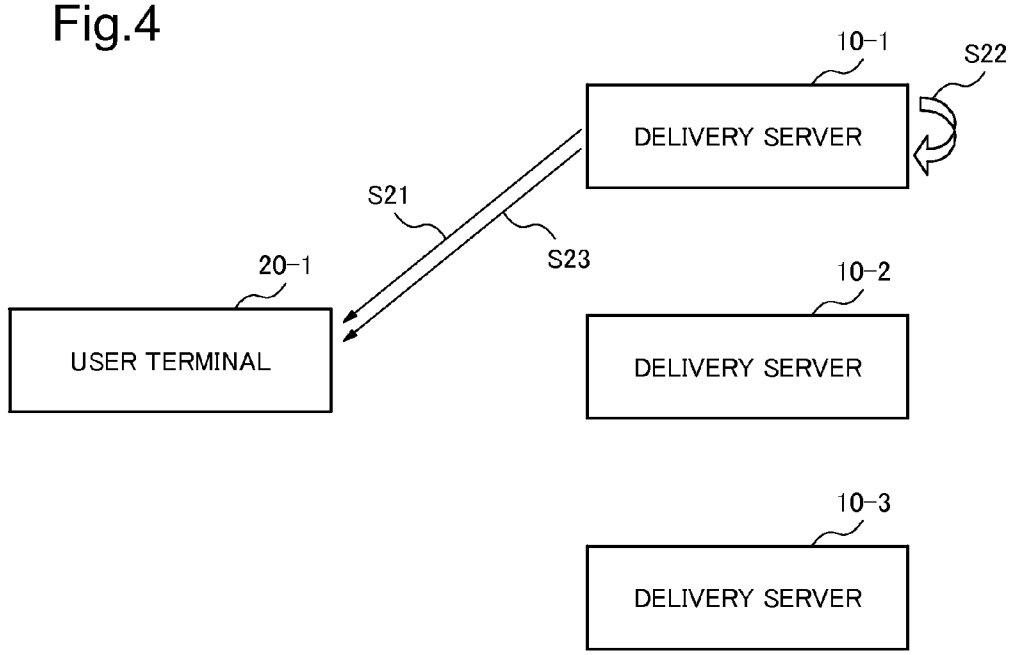
FIG. 4 is a block diagram illustrating operation in case a delivery server confirms that redirection results reach an upper limit value of a number of redirections in the contents delivery system of FIG. 1

Next, description concerning the first exemplary embodiment for carrying out the invention will be made in detail with reference to drawings.

FIG. 1 indicates a block diagram of the first exemplary embodiment of a contents delivery system by the present invention.

In a contents delivery system 1 of this exemplary embodiment, a contents delivery server group 10 (hereafter contents delivery server is also referred to as delivery server) and a user terminal group 20 are connected bidirectional via a network 30.

The user terminal group 20 includes, for example, n units (n is a natural number of no smaller than 2).

The delivery server group 10 includes, for example, m units (m is a natural number of no smaller than 2) of delivery servers 10-1 to 10-$m$.

The delivery servers 10-1-10-$m$ include a proper IP (Internet Protocol) address respectively.

Also, the delivery servers 10-1-10-$m$ are of an identical structure respectively and include: a contents storing unit 100, a load information exchanging unit 101, a load information management unit 102, a number of redirection calculating unit 103, a redirection unit 104, a delivery server selection unit 105 and a contents delivery unit 106.

Contents data of image contents is stored in the contents storing unit 100. Contents data stored in a certain delivery server may be same as the contents data stored in other delivery servers or it may also be different.

Also, contents data may be stored at least as a piece of contents data (segment). Here, "a piece" means a unit which indicates contents data which shows a series of animation.

Also, contents data may be stored in the respective contents storing units 100 of the delivery servers 10-1-10-$m$ separately as shown in FIG. 1, they may be stored in a storage which delivery servers 10-1-10-$m$ share, too.

The load information exchanging unit 101 exchanges mutually delivery load information of each delivery server among delivery servers 10-1-10-$m$ periodically or non-periodically at any time. By doing this, the load information exchanging unit 101 collects load information of other delivery servers in real time. The load information exchanging unit 101 stores this load information in the load information management unit 102.

The load information management unit 102 stores the collected load information of other delivery servers together with load information of own delivery server and updates them as required.

The number of redirection calculating unit 103 calculates an upper limit value of a number of redirections set for each of a certain fixed period of time. Here, "redirection" means operation which makes own delivery server hand over delivery to other delivery server at timing when a user terminal which is a contents delivery destination of own delivery server requests a next segment. The delivery server selection unit 105 decides other delivery server which is a hand over destination.

The redirection unit 104 includes a function to redirect within a range which does not exceed an upper limit value of a number of redirections set for each of a certain fixed period of time. Here, "redirection" means operation which makes own delivery server hand over delivery to other delivery server at timing when a user terminal which is a contents delivery destination of own delivery server requests a next segment. Specifically, the redirection unit 104 redirects to any one of other delivery servers selected by the delivery server selection unit 105, which are with a lower load than own delivery server.

Furthermore, whenever redirected, the redirection unit 104 counts a number of redirections. And the redirection unit 104 compares and determines whether its counted value is over the upper limit value Rmax of a number of redirections which the number of redirection calculating unit 103 calculated at the time of redirection confirmation (redirection results confirmation). And when the counted value does not reach the upper limit value Rmax, the redirection unit 104 performs redirection.

The delivery server selection unit 105 selects other delivery server with a lower load. In case a plurality of other delivery servers of a lower load than own delivery server exit, the delivery server selection unit 105 selects, for example, in order set in advance, at random, or other delivery server with a lowest load. Its selection method may be any method.

The contents delivery unit 106 delivers contents data (set of segment) to the user terminals 20-1-20-$n$.

The user terminals 20-1-20-$n$ at least include: a contents delivery request transmission unit; a reception unit of delivered contents data; a display unit which displays image data which is contents data; a delivery request switching unit respectively. When information of redirection is received from a delivery server of a contents delivery request destination, the delivery request switching unit switches the contents delivery request destination to a redirected delivery server and performs a contents delivery request. Further, although contents data in the present invention is not limited to image data, in this exemplary embodiment, description will be made supposing that delivery servers 10-1-10-$m$ are image delivery servers which deliver image data.

Next, operation of the whole of this exemplary embodiment will be described in detail with reference to block diagrams of FIG. 2, FIG. 3, FIG. 4, FIG. 5 and FIG. 6. Here, for convenience's sake of explanation, operation among arbitrary one user terminal 20-1 in the user terminal group 20 of FIG. 1 and arbitrary three delivery servers 10-1, 10-2 and 10-3 in the delivery server group 10 will be described.

First, operation in case free resources exist in a delivery server of a contents delivery request destination will be described together with FIG. 2.

In FIG. 2, it is supposed that the user terminal 20-1 requested delivery of a segment 001 of contents A to the delivery server 10-1 (Step S1).

Then, in the delivery server 10-1 of the contents delivery request destination, the load information exchanging unit 101 confirms whether there exist free resources in own delivery server by referring to load information stored in the load information management unit 102 (Step S2).

In case the delivery server 10-1 determines that there exist free resources in own delivery server (resource usage rate is not 100%), the segment 001 of contents A is delivered by the contents delivery units 106 to the user terminal 20-1 (Step S3). Further, contents A are stored in the contents storing unit 100.

Next, operation in case no free resources exist in a delivery server of a contents delivery request destination will be described using FIG. 3.

In FIG. 3, it is supposed that the user terminal 20-1 requested a segment 001 of contents A to the delivery server 10-1 (Step S11). Then, in the delivery server 10-1 of the contents delivery request destination, the load information exchanging unit 101 confirms whether there exit free resources in own delivery server by referring to load information stored in the load information management unit 102 (Step S12).

And in case the delivery server 10-1 determines that there exist no free resources in own delivery server (resource usage rate is 100%), any one of other delivery servers with a lower load than own delivery server (here, delivery server 10-2) is selected (Step 12). This selection is performed by the delivery server selection unit 105 based on the load information of other delivery servers stored in the load information management unit 102.

Redirection is performed by the redirection unit 104 at timing of a next segment request of the user terminal 20-1 to the selected delivery server 10-2 (Step S13). As a result, the user terminal 20-1 requests delivery of the segment 001 of contents A to the delivery server 10-2 (Step S14).

Then, the delivery server 10-2 confirms whether there exist free resources in own delivery server (Step S15). In case it is determined that there exist free resources, the segment 001 of contents A is delivered by the contents delivery unit 106 to the user terminal 20-1 of a delivery request source (Step S16). Further, the segment 001 of contents A is stored in the contents storing unit 100 of own delivery server.

Next, operation will be described using FIG. 4 in case a delivery server confirms that redirection results reached an upper limit value of a number of redirections. In FIG. 4, when delivery of a segment 001 of contents A to the user terminal 20-1 of a delivery request source approaches completion (Step S21), the delivery server 10-1 confirms redirection results by the redirection unit 104 (Step S22).

As a result, the redirection unit 104 of the delivery server 10-1 confirms that the redirection results reached the upper limit value of the number of redirections calculated by the number of redirection calculating unit 103. And according to a next segment request by the user terminal 20-1 which follows, a next segment 002 of contents A stored in the contents storing unit 100 is delivered by the contents delivery unit 106 (Step S23).

Next, operation will be described together with FIG. 5 in case a delivery server confirms that redirection results do not reach an upper limit value of a number of redirections.

Figure 5:
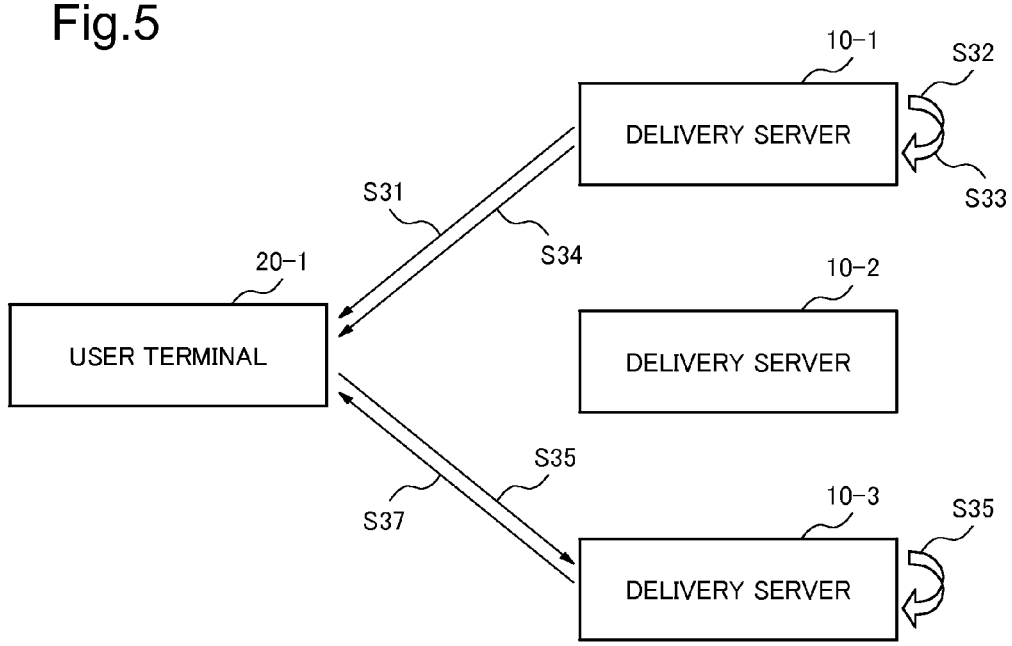
FIG. 5 is a block diagram illustrating operation in case a delivery server confirms that redirection results do not reach an upper limit value of a number of redirections in the contents delivery system of FIG. 1.

In FIG. 5, when delivery of a segment 001 of contents A to the user terminal 20-1 approaches completion (Step S31), the delivery server 10-1 confirms redirection results by the redirection unit 104 (Step S32).

As a result, the redirection unit 104 of the delivery server 10-1 confirms that redirection results do not reach the upper limit value of the number of redirections calculated by the number of redirection calculating unit 103. In this case, any one of other delivery servers with a lower load than own delivery server (delivery server 10-3) is selected by the delivery server selection unit 105 based on load information of other delivery servers stored in the load information management unit 102 (Step S33).

Next, the delivery server 10-1 is redirected to the delivery server 10-3 by the redirection unit 104 at timing of a next segment request by the user terminal 20-1 (Step S34).

Then, the user terminal 20-1 requests delivery of a next segment 002 of contents A to the delivery server 10-3 (Step S35).

Following this delivery request, the delivery server 10-3 confirms whether there exist free resources in own delivery server (Step S36). In case it is confirmed that there exist free resources in own delivery server, the delivery server 10-3 delivers the segment 002 of contents A stored in the contents storing unit 100 of the delivery server 10-3 by the contents delivery unit 106 to the user terminal 20-1 of a contents delivery request source (Step S37).

Next, operation at the time of load information exchange among the delivery servers 10-1-10-3 will be described using FIG. 6.

Figures 6, 7:
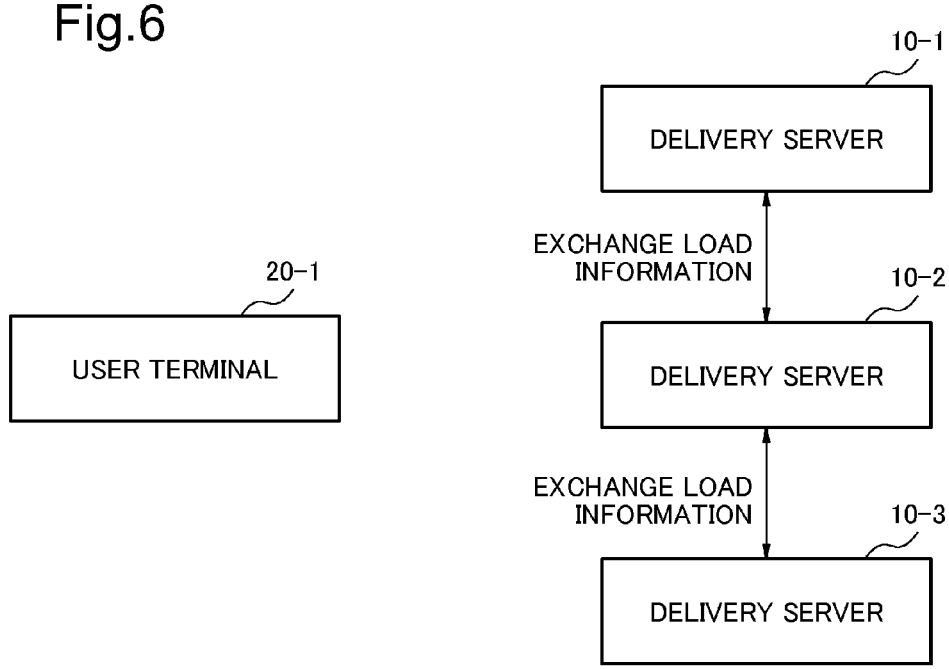
FIG. 6 is an explanatory drawing of operation at the time of load information exchange between delivery servers in the contents delivery system of FIG. 1.
FIG. 7 is a figure showing an example of present load information data for each delivery server stored in a load information management unit in FIG. 1.

In FIG. 6, the delivery servers 10-1, 10-2 and 10-3 exchange load information periodically with a delivery server set in advance by the load information exchanging unit 101 respectively, and store the exchanged load information data in the load information management unit 102.

FIG. 7 indicates an example of present load information data for each delivery server stored in the load information management unit 102.

As shown in FIG. 7, the load information data includes an IP address and a load. The load shown in FIG. 7 indicates resource usage rate. Here, the resource usage rate is calculated by Resource usage rate=bit rate of data which is being delivered [bps]/delivery capacity [bps]

Accordingly, in case the resource usage rate is "1.0", it represents that the load is 100%, and further delivery cannot be performed any more.

In this exemplary embodiment, at the time of load information exchange, it is possible to grasp in real time and efficiently the load status of the delivery servers in the vicinity as a whole by transmitting and receiving each other possessed information of own delivery server and all of the other delivery servers only with the delivery servers in the vicinity. Accordingly, load information does not have to be exchanged among the whole delivery servers 10-1-10-m. As a result, for the delivery servers 10-1-10-3, it becomes possible to perform self-controlled balancing processing which redirects to a delivery server with a lower load than own delivery server without using a load balancer or a media director. This makes possible striving for balancing and smoothing of a load of a delivery server, and in addition, preventing degradation of viewing quality. Further, here, cases where redirection is performed are: a case when there exist no free resources in own delivery server described in FIG. 3, and a case when a number of redirections does not reach an upper limit value of a number of redirections described in FIG. 5.

As a result, this exemplary embodiment can avoid a situation in which a request load and a delivery load concentrate on a load balancer or a media director. That is, this exemplary embodiment does not need to require a load balancer nor a media director of high processing power. Thus, this exemplary embodiment makes it possible to prevent cost of a delivery system becoming high. Also, this exemplary embodiment makes it possible to prevent a situation where processing power of a load balancer or a media director becomes a bottleneck, and an image cannot be delivered stably.

Also, in a method in which each user terminal performs a delivery request of contents data to a desired delivery server among a plurality of delivery servers which deliver contents data, obtains load information of the delivery server from the obtained delivery data, and decides the delivery server based on a comparison result of the load, there are following problems. In this method, an inquiry of a load status takes place frequently from a user terminal to a delivery server, and the load of the delivery server becomes extremely high. In particular, in case a number of connections of user terminals n is large, delivery capability as a whole of the contents delivery system degrades remarkably.

In contrast, in this exemplary embodiment, by the following reason, it is possible to omit an inquiry of a load status from a user terminal to a delivery server, and to prevent a degradation phenomenon of the delivery capability as a whole of the contents delivery system also in case a number of connections of user terminals n is large. The reason is, it is possible to grasp the load status in real time and efficiently by performing load information exchange with the delivery servers in the vicinity among the delivery servers 10-1-10-m. Based on the load status of the delivery servers 10-1-10-m as a whole thus grasped, it is possible to perform self-controlled balancing processing in which a delivery server of a delivery request destination redirects to a delivery server with a lower load than own delivery server.

Figure 8:
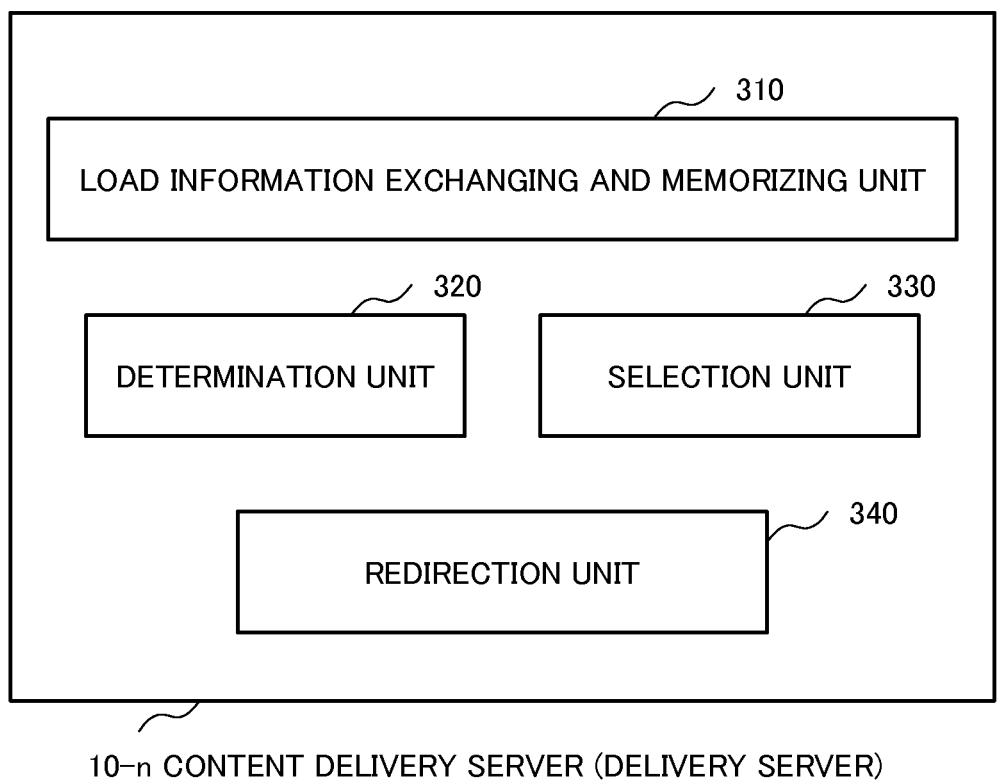
FIG. 8 is a block diagram of other exemplary embodiment of a contents delivery system of the present invention.

Next, the second exemplary embodiment for carrying out the invention will be described in detail with reference to FIG. 8.

This exemplary embodiment is a contents delivery server characterized by including: a load information exchanging and memorizing unit 310 which receives and memorizes load information (other server information) from other contents delivery servers in a network, and memorizes load information of own contents delivery server (own server information); a determination unit 320 which determines presence of free resources of own contents delivery server based on the information of own server; a selection unit 330 which, in case the determination unit 320 determined that there are no resources, selects one or more other contents delivery servers with a lower load than own server from among other contents delivery servers based the own server information and the other server information; and a redirection unit 340 which requests to the selected other contents delivery server delivery of contents which are targets of a contents delivery request to a user terminal which transmitted the contents delivery request.

According to this exemplary embodiment, it is possible to strive for balancing and smoothing of a load of a delivery server and prevent degradation of viewing quality without using a load balancer or a media director, and without inquiring a load status from a user terminal to a delivery server.

Embodiment 1

Next, operation of a mode for carry out the invention will be described using a specific embodiment.

In this embodiment, an average resource usage rate of the whole delivery servers 10-1-10-m during information update cycle T [sec] is supposed to be U. Also, in this embodiment, an average resource usage rate of the i-th (i=1−m) delivery server 10-i is supposed to be $U_i$, and an average number of concurrent connections of the delivery server 10-i is supposed to be $C_i$. Also, in this embodiment, an average segment size is set to S [sec].

At this time, this embodiment supposes, for the delivery server 10-i, that a method which derives an upper limit value Rmax of a number of redirections at a next cycle is a method indicated in the following.

Here, "redirection" means operation in which the delivery server 10-*i* hands over delivery to other delivery server at a predetermined timing which is decided by operation of the j-th (j=1−n) user terminal 20-*j* of a contents delivery destination.

"Predetermined timing" is the timing when the user terminal 20-*j* requests a segment next to the segment which is delivered at present.

The delivery server 10-*i* calculates the average resource usage rate U of the whole delivery servers 10-1-10-*m*, the average resource usage rate Ui of the delivery server 10-*i*, and the average number of concurrent connection Ci of the delivery server 10-*i* respectively based on load information data collected during a previous cycle. Also, it is supposed that the average segment size S is known in advance.

At this time, the delivery server 10-*i* calculates the upper limit value Rmax of a number of redirections as follows at a starting time of the next information update cycle.

(1) If U>=Ui, then Rmax=0
(2) If U<Ui, then Rmax=(Ui−U)×Ci×T/S

The case of (1) is a case when the average resource usage rate U of all the delivery servers is not less than the average resource usage rate Ui of each of the delivery server 10-*i* of a contents delivery request destination. At this time, since the load of the delivery server 10-*i* is low, the upper limit value Rmax of a number of redirections is set to "0", and the delivery server does not perform redirection.

The case of (2) is a case when the average resource usage rate Ui of each of the delivery server 10-*i* of a contents delivery request destination is larger than the average resource usage rate U of all the delivery servers. At this time, the upper limit value Rmax of a number of redirection is set to a numerical value by which an excess from the load average value "Ui-U" among a planned number of segments to be viewed during the period T "Ci×T/S" is redirected to other delivery servers.

As mentioned above, in this embodiment, the delivery server determines whether it redirects or not in units of segment based on the upper limit value Rmax of a number of redirections. Therefore, this embodiment realizes fine load balancing in units of segment and also suppresses a delivery server with a low load performing excessive redirection. As a result, according to this embodiment, a delivery server can deliver an image to a user terminal stably, in particular, even in case a number of connections of user terminals is large.

Further, the present invention is not limited to the exemplary embodiments or embodiments mentioned above.

For example, a program for contents delivery which realizes operation in each block of the delivery servers 10-1-10-*m* shown in FIG. 1 and operation of each step described in FIG. 2-FIG. 5 by a computer in the delivery servers is also included.

Although the present invention has been described with reference to an exemplary embodiment and an embodiment above, the present invention is not limited to the exemplary embodiment and embodiment mentioned above. Various changes which a person skilled in the art can understand in the scope of the present invention can be performed in the composition and details of the present invention.

This application claims priority based on Japanese Patent Application No. 2009-192739 filed on Aug. 24, 2009 and the disclosure thereof is incorporated herein in its entirety.

INDUSTRIAL APPLICABILITY

By self-controlled balancing processing among delivery servers, the present invention makes it possible to strive for smoothing of a load of a delivery server and to prevent degradation of viewing quality.

Also, by applying the present invention to a streaming delivery server, improvement of viewing quality of a user terminal can be expected.

In particular, in an IP network such as the internet, when streaming delivery of sound or image, portal services and so on are performed in large scale, by applying the present invention, big effect mentioned above can be expected when coping with requests from a large number of user terminals.

DESCRIPTION OF CODES

10 Delivery server group (contents delivery server group)
10-1-10-*m* Delivery server (contents delivery server)
20 User terminal group
20-1-20-*n* User terminal
30 Network
100 Contents management unit
101 Load information exchanging unit
102 Load information management unit
103 Number of redirection calculating unit
104 Redirection unit
105 Delivery server selection unit
106 Contents delivery unit

The invention claimed is:

1. A contents delivery server comprising:
a processor; and
a memory,
wherein the memory is configured to store and processor is configured to implement:
a load information exchanging unit which receives from each of other contents delivery servers in a network and memorizes other server information which is load information of said other contents delivery servers and memorizes own server information which is load information of own contents delivery server, and determines presence of free resources of own contents delivery server based on said own server information;
a delivery server selection unit which, in case said determination unit determined that there exist no free resources, selects one or more other contents delivery servers with a lower load than own contents delivery server from among said other contents delivery servers based on said own server information and said other server information; and
a redirection unit which requests to said other contents delivery servers selected delivery of contents which are targets of a contents delivery request to a user terminal which transmitted said contents delivery request, and a number of redirection calculation unit which calculates a maximum value of a number of requests of delivery by said redirection unit during a fixed period of time P based on an average resource usage rate of all said contents delivery servers and an average resource usage rate of said own contents delivery server obtained from said other server information and said own server information received during a fixed period of time T just before said fixed period of time P, and wherein
the redirection unit determines whether or not said number of requests during said fixed period of time P reaches said maximum value, and, in case said number of requests reaches said maximum value, does not request said delivery.

2. The contents delivery server according to claim 1, wherein said delivery server selection unit selects one of said other delivery servers
for each segment of which said contents are composed.

3. A contents delivery system comprising: a plurality of contents delivery servers according to claim 1 and a plurality of said user terminals.

4. A contents delivery system comprising: a plurality of contents delivery servers according to claim 2; and a plurality of said user terminals.

5. A contents delivery method comprising:
receiving from each of other contents delivery servers in a network and memorizing other server information which is load information of said other contents delivery servers and memorizing own server information which is load information of own contents delivery server;
determining presence of free resources of own contents delivery server based on said own server information;
in case determined that there exist no free resources,
selecting one or more said other contents delivery servers with a lower load than own contents delivery server among said other contents delivery servers based on said own server information and said other server information;
requesting to said other contents delivery servers selected delivery of contents which are targets of a contents delivery request to a user terminal which transmitted said contents delivery request;
calculating a maximum value of a number of requests of delivery during a fixed period of time P based on an average resource usage rate of all said contents delivery servers and an average resource usage rate of said own contents delivery server obtained from said other server information and said own server information received just before said fixed period of time P and during a fixed period of time T; and
determining whether or not said number of requests during said fixed period of time P reaches said maximum value and, in case said number of requests reaches said maximum value, not making request of said delivery.

6. The contents delivery method according to claim 5, wherein one or more of said other delivery servers for each segment of which said contents are composed are selected in said selection.

7. A non-transient computer-readable medium which stores a data management program causing a computer to execute:
load information exchanging processing which receives from each of other contents delivery servers in a network and memorizes other server information which is load information of said other contents delivery servers, and memorizes own server information which is load information of own contents delivery server, and determines presence of free resources of own contents delivery server based on said own server information;
a delivery server selection processing which, when said determination processing determined that there exist no free resources, selects one or more other contents delivery servers with a lower load than own contents deliver server among said other contents delivery servers based on said own server information and said other server information;
redirection processing where requests to said other contents delivery servers selected delivery of contents which are targets of a contents delivery request to a user terminal which transmitted said contents delivery request, and
a number of redirection calculation processing which calculates a maximum value of a number of requests of delivery by said redirection processing during a fixed period of time P based on an average resource usage rate of all said contents delivery servers and an average resource usage rate of said own contents delivery server obtained from said other server information and said own server information received during a fixed period of time T just before said fixed period of time P, wherein
the redirection processing determines whether or not said number of requests during said fixed period of time P reaches said maximum value, and, in case said number of requests reaches said maximum value, does not request said delivery.

8. The non-transient computer-readable medium according to claim 7,
wherein said contents are composed of a one or more segments.

9. The non-transient computer-readable medium according to claim 8 which stores said data management program causing said computer to executes said number of redirection number calculating processing calculates
said maximum value, Rmax,
by using an average resource usage rate U of said all of the contents delivery servers, an average resource usage rate Ui of said own contents delivery server, an average number of concurrent connection Ci of said own contents delivery server, and an average segment size S during said fixed period of time T obtained just before said fixed period of time P as
(1) if U>=Ui then Rmax=0
(2) if U<Ui then Rmax=(Ui−U)×Ci×T/S.

* * * * *